Sept. 23, 1941.   L. H. SQUIRES   2,256,531
LAWN MOWER
Filed April 15, 1940
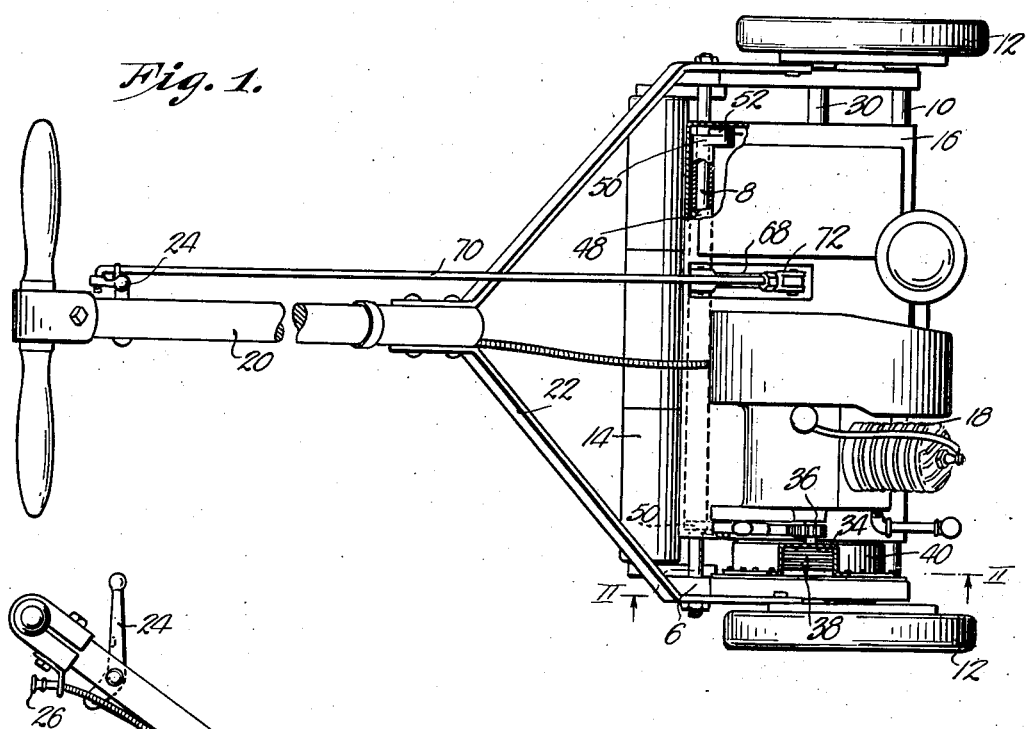
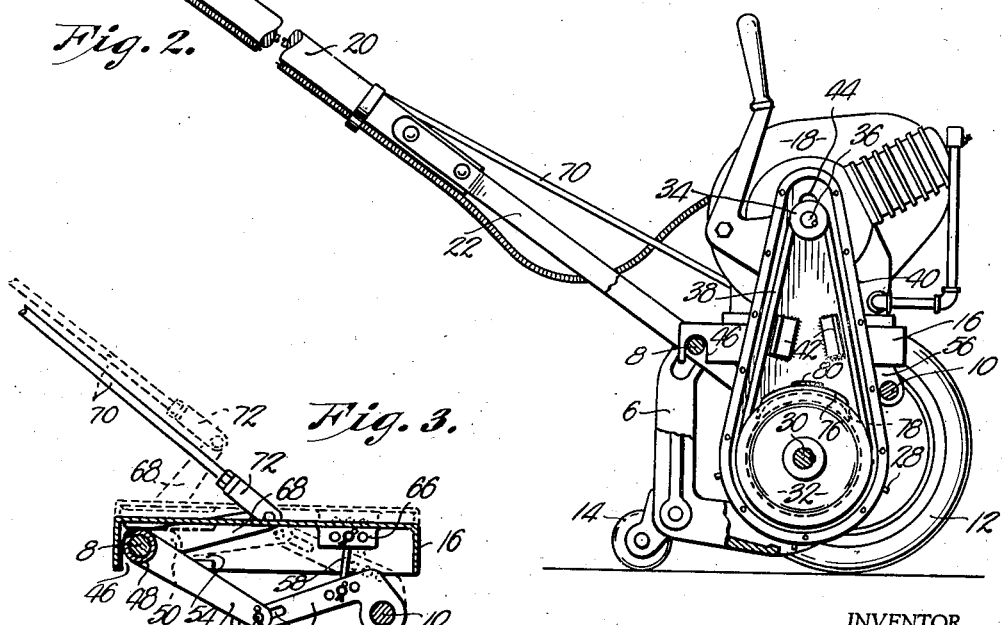
INVENTOR.
Lloyd H. Squires
BY Hovey & Hamilton
ATTORNEYS Patented Sept. 23, 1941

2,256,531

UNITED STATES PATENT OFFICE 2,256,531

LAWN MOWER

Lloyd H. Squires, Olathe, Kans.

Application April 15, 1940, Serial No. 329,673

8 Claims. (Cl. 56—26)

This invention relates to lawn mowers of the power type wherein an engine carried by the mower is shifted to and from a position where a belt, interconnecting the engine and cutting reel, is rendered taut or slack to control the driving connection between engine and reel.

The primary object of this invention is the provision of a power lawn mower wherein is incorporated rugged, inexpensive and efficient means for shiftably supporting the engine thereof, so that the operator may easily move the engine to and from a normal position where the belt is taut.

Another important object of this invention is to provide a power lawn mower with novel, unique and effective means for encasing the endless belt thereof, so that the stretches of said belt will be protected, held against inward or outward bowing, and maintained isolated from the effects of foreign matter which would otherwise enter the grooves of the pulleys over which it passes.

This invention has for another aim, the provision of a mowing machine of the aforementioned character wherein the power unit thereof is mounted upon a carrier, parts of which are compactly arranged below said carrier and upon the conventional frame in such fashion as to hold the carrier in a horizontal plane throughout its path of travel so that ease of handling is insured and overbalancing is avoided.

Other objects of the invention will appear during the course of the following specification, referring to the accompanying drawing wherein:

Figure 1 is a top plan view of a lawn mower made in accordance with the present invention.

Fig. 2 is a vertical sectional view through the same taken on line II—II of Fig. 1; and Fig. 3 is a fragmentary vertical sectional view through the engine carrier, showing the same without the engine and in two positions.

It is my aim to produce a lawn mower having desirable features therein, the character of which may or may not be associated with mowing machines made in accordance with Letters Patent No. 2,082,600, isued June 1, 1937, and described in my co-pending application Serial No. 288,137, filed August 3, 1939, of which this application is a continuation in part.

Only the preferred embodiment of this invention is illustrated in the accompanying drawing. This mowing machine comprises a frame 6, parts of which include tie-rods 8 and 10. Wheels 12 are carried by frame 6 as is the conventional sectional roller 14. When wheels and roller 12 and 14 respectively, are travelling along a horizontal surface, it is desirable to maintain the hereinafter more fully described carrier 16 for engine 18, in a horizontal plane, while the carrier 16 is moved to and from a normal position.

Handle 20 connected to frame 6 by yoke 22 carries an operating lever 24 and a throttle knob 26, both of which are disposed within reach of the operator.

A cutting reel 28 operably joined to wheels 12 through the medium of shaft 30, which forms a part thereof, is actuated through driven pulley 32 that receives its power from drive pulley 34 mounted upon drive shaft 36 of engine 18. An endless belt 38 travels around pulleys 32 and 34.

A housing and guide for belt 38 and pulleys 32 and 34, over which it rides, is broadly designated by the numeral 40 and is hung directly upon frame 6. This guide 40 has walls which are coextensive with the stretches of belt 38 and that lie in parallel relation along the outer sides of said stretches.

A pair of guards 42 mounted within housing 40 are disposed close to the inner sides of the stretches of belt 38 and thus, as will be understood from Fig. 2, the stretches of belt 38 will be held against bowing in either direction.

Engine 18 is directly connected to cutting reel 28 and in the commercial embodiment of the invention which applicant has tested in the field, it has been found desirable to use a plurality of V-belts 38. In the instance illustrated, two of such belts are employed.

Housing 40 is slotted as at 44 to provide freedom of movement for drive shaft 36.

Engine 18 is mounted directly upon carrier 16, the nature of which is as shown in Fig. 3. Depending flanges are provided at the edges of carrier 16 and the end flanges are slotted as at 46 so that tie-rod 8 is straddled. Slots 46 are created with straight sides which insure that carrier 16 will move in a vertical path to maintain its upper surface horizontal as the same moves to and from the normal position.

Means for shifting the engine and carrier must be simple yet strong enough to perform the heavy duty. The means contemplated by this invention comprises a tube 48 which is rotatably mounted upon tie-rod 8. This tube is confined between the flanges of the ends of carrier 16 and an eccentric 50 is at each end of tube 48 for the purpose of engaging carrier 16 at one longitudinal edge thereof. Each eccentric 50 has a head 52 which enters a way 54 so that as tube 48 is rotated, eccentrics 50 will positively move the carrier through a vertical path. The opposite longitudinal edge of carrier 16 is simultaneously raised and lowered through the medium of lever 56, link 58 and arm 60.

Lever 56 is pivotally mounted upon connecting rod 10 and projects inwardly toward the free end of arm 60 where it is joined thereto by pin 62 passing through slot 64. Link 58 is connected to lever 56 at a zone between the free end of the lever and tie-rod 10. This link 58 is pivotally connected to carrier 16 by an ear 66.

A rocker element 68 projecting radially from and rigidly connected to tube 48 has its free end joined to rod 70 through the medium of a clevis 72. Rod 70 is joined to operating lever 24 so that as the latter is moved in the direction of the arrow, shown in Fig. 2, carrier and engine 16 and 18 respectively, will be lifted to the normal position where belt 38 is taut.

The nature of eccentrics 50, lever 56, link 58 and arm 60 is such as to raise both longitudinal sides of carrier 16 with the same speed. This arrangement of parts together with guide slots 46 insures that carrier 16 will be horizontal throughout its path of travel and that the axes of driven and drive shafts 30 and 36 respectively, will be in vertical alignment while engine 18 is shifted.

The advantage of such construction is apparent to one skilled in the art for any tipping tendency is overcome and the work of the operator is minimized to the point of rendering the manipulation of the lawn mower easy.

The parts just above described, which embody the preferred form of the invention, are not only efficient in their operation but inexpensive to manufacture. The entire lawn mower is well balanced, compact and good looking when the parts are made as set forth above.

It is desirable to keep the groove of driven pulley 32 clean and free from foreign matter that might enter housing 40 and therefore, shoe 76 having a finger 78 thereon, is formed to occupy that part of the groove of pulley 32 not entered by belt 38. This shoe is secured to housing 40 by a bracket 80. Finger 78 is spaced slightly away from the edges of pulley 30 forming the groove and inclined so that it will lift any foreign matter from the groove.

It is known that mowing machines having different appearances than that illustrated herewith, may be made without departing from the spirit of the invention and scope of the appended claims.

Having thus described the invention, what is claimed as new and desired to be secured by Letters Patent is:

1. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; means for moving the carrier and engine to and from a normal position where the belt is taut enough to drive the cutting reel; and a guide and guard member for said belt rigid on the frame, said member being formed to completely encase the drive pulley, the driven pulley and the belt and to permit movement of the drive pulley as the engine and carrier are moved.

2. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; means for moving the carrier and engine to and from a normal position where the belt is taut enough to drive the cutting reel; and a guide and guard member for said belt rigid on the frame, said member being formed to completely encase the drive pulley, the driven pulley and the belt, said member being provided with a slot through one wall thereof permitting the passage and movement of the drive shaft as the engine and carrier are moved to and from the normal position.

3. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; means for moving the carrier and engine to and from a normal position where the belt is taut enough to drive the cutting reel; and a guide and guard member for said belt rigid on the frame, said member being formed to completely encase the drive pulley, the driven pulley and the belt, said guide and guard having members on each side of the stretches of the endless belt between the drive and driven pulleys to prevent bowing in either direction when the engine is moved from the normal position.

4. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; means for moving the carrier and engine to and from a normal position where the belt is taut enough to drive the cutting reel; and a guide and guard member for said belt rigid on the frame, said member being formed to completely encase the drive pulley, the driven pulley and the belt, said driven pulley having a shoe in that portion of the groove of the pulley not occupied by the belt, said shoe being held in place by a bracket mounted on said guard.

5. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; means for moving the carrier engine to and from a normal position where the belt is taut enough to drive the cutting reel; and a guide and guard member for said belt rigid on the frame, said member being formed to completely encase the drive pulley, the driven pulley and the belt, said guard having transverse members therein between the stretches of the endless belt to prevent inward bowing thereof when the engine is movd from the normal position.

6. In a mowing machine of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and cutting reel; an engine carrier movably mounted on the frame; and manually operable means for moving the carrier and engine to and from a normal position where the belt is taut enough to drive the cutting reel comprising a tube rotatably mounted on the frame, means extending along the handle to within reach of the operator for rotating the tube, and a plurality of radial arms on the tube and in connection with the carrier to raise and lower the same as the tube is rotated.

7. In a mowing machine of the character described having a frame, a cutting reel, an engine, and a belt extending between the engine and cutting reel to drive the latter when the belt is taut, means for shiftably supporting the engine comprising a platform provided with guide slots for receiving a portion of the frame; a tube rotatably mounted on the frame; a plurality of eccentrics on the tube having engagement with the carrier at one side thereof to raise and lower said one side; a lever rotatably mounted on the frame; a member joining said lever and the carrier at the opposite side thereof; and a radial arm on the tube in connection with the lever to cause the said opposite side of the carrier to raise and lower as the said one side is so moved.

8. In a mowing machine of the character described having a frame, a cutting reel, an engine, and a belt extending between the engine and cutting reel to drive the latter when the belt is taut, means for shiftably supporting the engine comprising a platform provided with guide slots for receiving a portion of the frame; a tube rotatably mounted on the frame; a plurality of eccentrics on the tube having engagement with the carrier at one side thereof to raise and lower said one side; a lever rotatably mounted on the frame; a member joining said lever and the carrier at the opposite side thereof; and a radial arm on the tube in connection with the lever to cause the said opposite side of the carrier to raise and lower as the said one side is so moved, said eccentrics, the lever and said joining member being arranged to cause the carrier to maintain a horizontal position throughout the path of travel.

LLOYD H. SQUIRES.